(12) United States Patent
Baldwin et al.

(10) Patent No.: US 7,895,627 B2
(45) Date of Patent: *Feb. 22, 2011

(54) PRE-FRAGMENTATION OF DATA DESTINED FOR LOW RESOURCE CLIENTS

(75) Inventors: James Armand Baldwin, Redwood City, CA (US); Peter T. Barrett, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/207,154

(22) Filed: Sep. 9, 2008

(65) Prior Publication Data

US 2009/0007182 A1 Jan. 1, 2009

Related U.S. Application Data

(63) Continuation of application No. 10/061,829, filed on Jan. 31, 2002, now Pat. No. 7,543,324.

(51) Int. Cl.
G06F 3/00 (2006.01)
G06F 13/00 (2006.01)
H04N 5/445 (2006.01)
H04N 7/173 (2006.01)
H04N 7/16 (2006.01)

(52) U.S. Cl. .................. 725/54; 725/134; 725/142
(58) Field of Classification Search .............. 725/54, 725/134, 142
See application file for complete search history.

(56) References Cited

U.S. PATENT DOCUMENTS

| | | | |
|---|---|---|---|
| 5,754,771 A * | 5/1998 | Epperson et al. ............ 709/203 |
| 5,781,226 A * | 7/1998 | Sheehan ..................... 725/134 |
| 6,397,386 B1 | 5/2002 | O'Connor et al. |
| 6,507,950 B1 * | 1/2003 | Tsukidate et al. ............. 725/54 |
| 6,532,517 B1 | 3/2003 | Wagner et al. |
| 6,614,804 B1 | 9/2003 | McFadden et al. |
| 6,675,385 B1 * | 1/2004 | Wang .......................... 725/39 |
| 6,804,708 B1 | 10/2004 | Jerding et al. |
| 6,909,384 B2 * | 6/2005 | Baldwin et al. ............... 341/55 |
| 6,928,653 B1 * | 8/2005 | Ellis et al. ..................... 725/50 |
| 6,937,171 B2 * | 8/2005 | Baldwin et al. ............... 341/87 |
| 7,026,964 B2 * | 4/2006 | Baldwin et al. ............... 341/87 |
| 7,148,823 B2 * | 12/2006 | Baldwin et al. ............... 341/87 |
| 7,151,471 B2 * | 12/2006 | Baldwin et al. ............... 341/87 |
| 7,168,085 B2 * | 1/2007 | Baldwin et al. ............... 725/50 |
| 7,543,324 B2 * | 6/2009 | Baldwin et al. ............... 725/54 |
| 2002/0059623 A1 | 5/2002 | Rodriguez et al. |

OTHER PUBLICATIONS

"Microsoft Press Computer Dictionary", Third Edition, 1997, Microsoft Press, pp. 3.

"The Authoritative Dictionary of IEEE Standards Terms", Seventh Edition. Standards Information Network, IEEE Press. 2000. pp. 4.

* cited by examiner

*Primary Examiner*—Michael Van Handel
(74) *Attorney, Agent, or Firm*—Lee & Hayes, PLLC

(57) ABSTRACT

Program data for use in electronic program guides is fragmented in advance of delivery to a low resource client. In the described implementation, the program data is fragmented into equal size fragments. The size of each fragment is selected to guarantee that the data fragments will fit in pre-allocated memory segments at the client. When the program data is delivered to the client, the client stores the data packets in the memory segments without making system calls to the memory.

18 Claims, 4 Drawing Sheets

PRE-FRAGMENTATION OF DATA DESTINED FOR LOW RESOURCE CLIENTS

REFERENCE TO RELATED APPLICATION

This application is a continuation of U.S. patent application Ser. No. 10/061,829, filed Jan. 31, 2002, which is incorporated in its entirety by reference herein.

TECHNICAL FIELD

This invention relates to television entertainment architectures in which program data is generated, processed, and distributed to low resource clients, such as set top boxes. More particularly, this invention relates to fragmenting the program data in advance of delivery to the client so that the data fragments fit in memory blocks of pre-specified size at the client.

BACKGROUND

Electronic program guides (EPGs) enable TV viewers to navigate through an onscreen program guide and locate shows. With the guides, viewers can look at schedules of current and future programming, set reminders for upcoming programs, or enter instructions to record one or more shows.

Program data for an EPG is stored in the client memory. The amount of program data available for the EPG is dependent upon the resource environment at the client. In a low-resource environment, meaning the client has limited memory and/or processing resources, the amount of memory reserved for program data is limited. Making this situation more difficult is that every time a free memory call is made, the limited amount of memory is fragmented. This fragmentation effectively uses up memory space unless a de-fragmentation or garbage collection process is run. In the low-resource environment, however, such memory management techniques are too resource expensive to be viable options.

Accordingly, for such low-resource environments, there is a need to improve the way program data is stored and accessed at the client.

SUMMARY

Program data for use in electronic program guides is fragmented in advance of delivery to a low resource client. In the described implementation, the program data is fragmented into equal size fragments. The size of each fragment is selected to guarantee that the data fragments will fit in pre-allocated memory segments at the client. When the program data is delivered to the client, the client stores the data packets in the memory segments without making system calls to the memory.

DETAILED DESCRIPTION

The following discussion is directed to television entertainment systems, such as interactive TV networks, cable networks that utilize electronic program guides, and Web-enabled TV networks. Clients in such systems range from full-resource clients with substantial memory and processing resources (e.g., TV-enabled personal computers, TV recorders equipped with hard-disks) to low-resource clients with limited memory and/or processing resources (e.g., traditional set-top boxes). While aspects of the systems and methods described below can be used in any of these systems and for any types of clients, they are particularly well suited for systems with low-resource clients. Hence, the following discussion describes the systems and methods in the context of a low-resource environment.

Television Entertainment System

Figure 1:
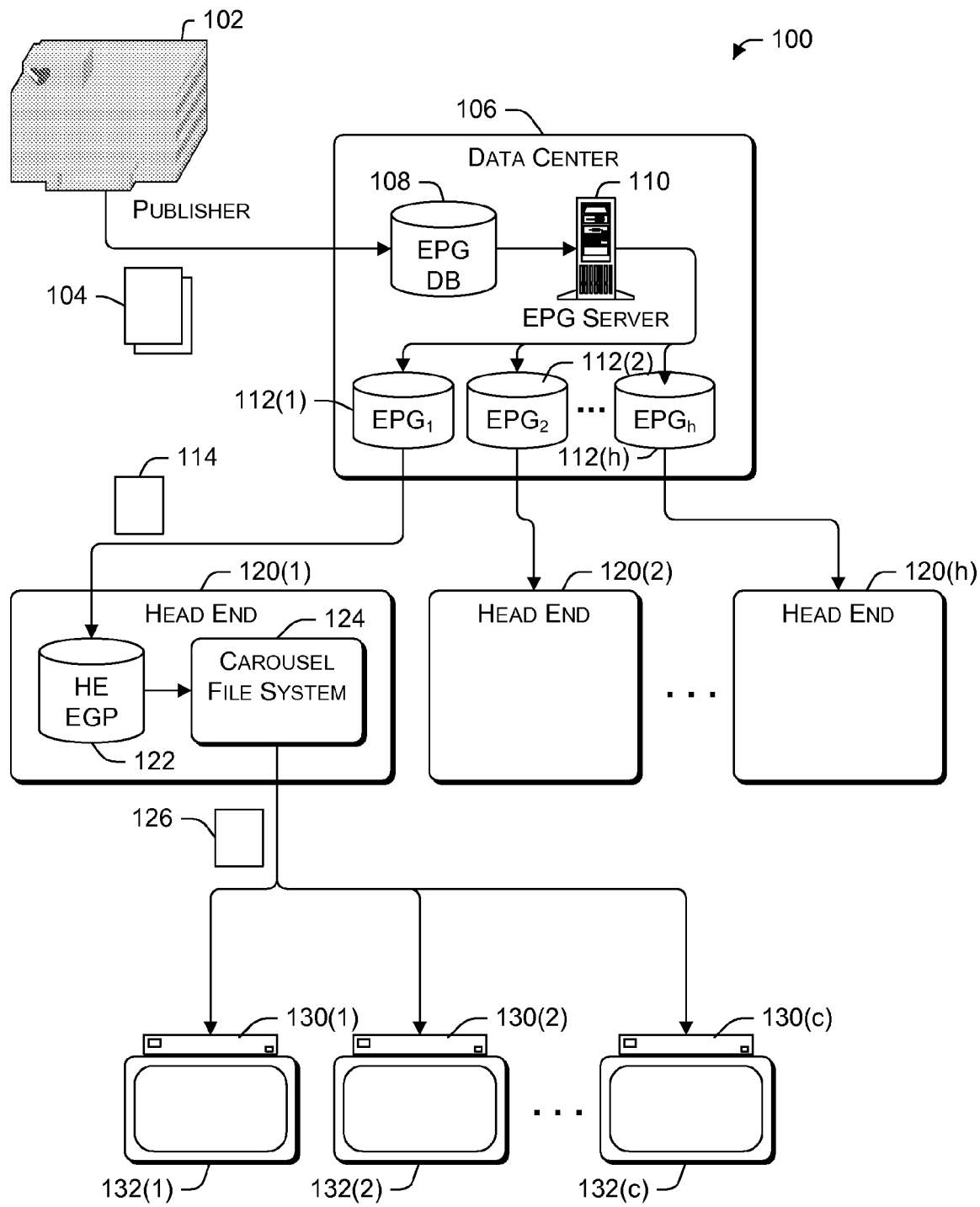
FIG. 1 illustrates a television entertainment system including a publisher to generate program data, a data center to process the program data, and one or more head ends to distribute the program data to multiple clients.

FIG. 1 shows a television entertainment system 100 that facilitates distribution of program data from a publisher to the viewers. System 100 includes a publisher 102 that creates the program data. One example of a publisher 102 is the Tribune Corporation, which generates data for interactive television networks. As used herein, program data refers to the type of data that might be used by an electronic program guide (EPG) and/or to facilitate interactive television functionality. Program data includes program titles, ratings, characters, description, actor names, year made, and so on. The terms "program data" and "EPG data" are used interchangeably throughout this disclosure.

The EPG data is transferred as an electronic file 104 from the publisher 102 to a data center 106. As one example, the program data 104 is transferred using a file transfer protocol (FTP) over a TCP/IP network (e.g., Internet, UNIX, etc.) to the data center 106. The electronic file 106 is stored in an EPG database 108 at the data center 106.

The original version of the EPG data contains all of the programming information for multiple days. An EPG server 110 resides at the data center 106 to process the EPG data prior to distribution. The processing involves one or more techniques to condition the EPG data so that a low resource client can handle the data more effectively. Low resource clients, such as a set top box, are typically characterized as having limited memory and/or processing resources. Such clients may not be able to store the entire original version of the EPG data. With limited resources at the client, the processes performed by the EPG server 110 are helpful to pre-condition the EPG data into a more suitable form for storage and processing at the client.

Among other processes, the EPG server 110 is configured to reduce the amount of EPG data so that it can be stored at low-resource clients. The EPG server 110 might also alter the format or structure of EPG data 104 to enable easier searching or other processes at the clients. The EPG server 110 might also compress the EPG data prior to its distribution.

The EPG server 110 creates different versions of the program data for different head end services to account for programming preferences and lineups. For example, the EPG server 110 limits the EPG data to those channels that are relevant to the respective head ends. In the illustrated example, the EPG server 110 creates multiple versions of the EPG data, which are designated as $EPG_1$, $EPG_2$, ..., $EPG_h$, and stores them in respective databases 112(1), 112(2), ..., 112(h). The data center 106 transfers the head end versions of the EPG data as electronic files 114 to associated head end services 120(1), 120(2), ..., 120(h) using, for example, FTP or other suitable transfer protocols over a network.

At individual head end services, as represented by service 120(1), the EPG data is stored in a head end database 122. A carousel file system 124 repeatedly broadcasts the EPG file 126 over an out-of-band (OOB) channel to the clients 130(1), 130(2), ..., 130(c). The distributed EPG file 126 may or may not be identical to the file 114 received from the data center 106. Distribution from the head ends 120 to the clients 130 may be accommodated in a number of ways, including cable, RF, microwave, network (e.g., Internet), and satellite.

In the illustrated implementation, the clients 130 are embodied as set top boxes (STBs) connected to associated televisions 132(1), 130(2), ..., 132(c). The clients 130 are often equipped with sufficient processing and storage capabilities to store and run an operating system and a few programs. Examples of programs stored on a client might include a Web browser, an electronic programming guide, a personal scheduler, and so forth. Although the STBs are shown separately from the television sets, they may alternatively be built into the television sets as integral units. Furthermore, in other implementations, the clients may be embodied as other devices capable of handling EPG data, such as a broadcast-enabled computer, an information appliance, or the like.

Exemplary EPG Server

Figure 2:
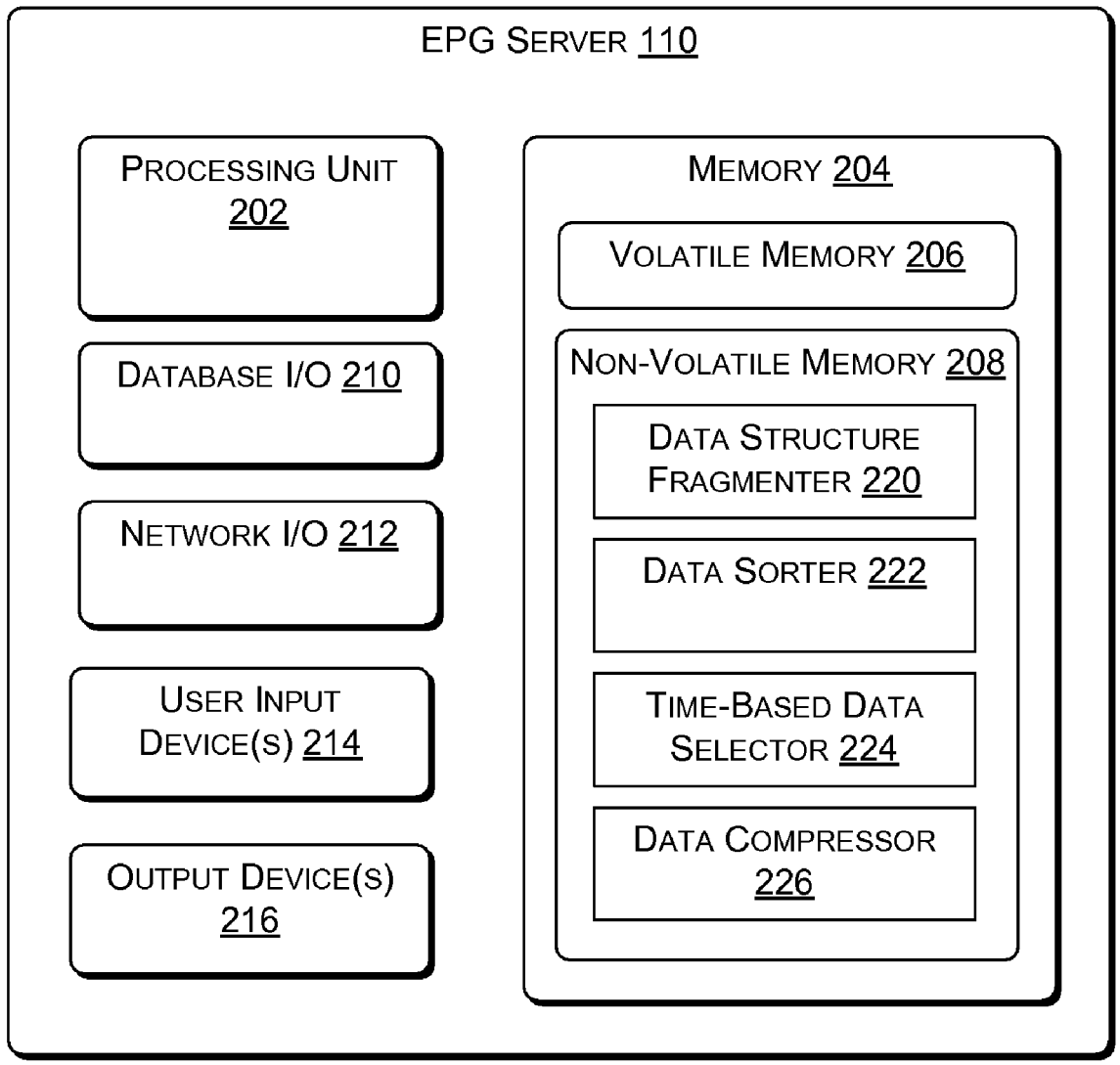
FIG. 2 is a block diagram of a server computer resident at the data center to process the program data.

FIG. 2 shows an exemplary implementation of the EPG server 110. It has a processing unit 202 and memory 204. Memory 204 includes volatile memory 206 (e.g., RAM) and non-volatile memory 208 (e.g., ROM, flash, floppy disk, hard disk, CD-ROM, disk array, etc.). The server 110 may be further equipped with a database I/O 210 to interface with the EPG database 108 and/or version databases 112(l)-112(h) and a network I/O 212 to provide access to one or more networks. The server 110 may optionally be equipped with one or more input devices 214 (e.g., keyboard, mouse, track ball, touch panel screen, etc.) and one or more output devices 216 (e.g., display, printer, etc.).

One or more programs are stored in memory 204 and executed on processing unit 202 to process the EPG data. The programs include a data structure fragmenter 220, a program table constructor 222, a time-based data selector 224, and a data compressor 226. The EPG server 110 also runs an operating system (not shown), such as a Windows® brand operating system from Microsoft Corporation, or a Unix-based operating system.

The various processes performed by the EPG server 110 are intended to place the EPG data in better condition for handling by the low resource client. The data structure fragmenter 220 pre-formats the data at the server for use by the client. The client 130 has previously designated an arbitrary data set size for a particular application, such as an EPG application, and allocates a block of memory in segments of that size. The arbitrary size is communicated to the EPG server 110, and the data structure fragmenter 220 "fragments" the data in advance of delivery to the client 130. The client-designated arbitrary data size is thus guaranteed by the server 110 to be the size of data transmitted to the client. Therefore, when the client 130 receives the data, the client can allocate the data packets to the pre-allocated segments in memory without making system calls to the memory.

The data sorter 222 pre-sorts EPG data to improve searching at the client. The EPG data is pre-sorted according to a type of field, such as a title. The data sorter 222 constructs a table with the pre-sorted data and this table is used by the client to facilitate fast searches, even though the client has limited processing resources.

The time-based data selector 224 selects which program data to be included in the file to be downloaded to the client. Low resource clients may not be able to store and display program schedule information for multiple days because of limited memory. The time-based selector 224 selectively stores more data for a current time period represented by the EPG (e.g., the current day) and progressively less data over time for subsequent time units (e.g., next several days). This enables a rich display of information for the time period in which viewers are most likely interested, while offering some additional subset of data for future programming.

The data compressor 226 can be used to compress data destined for the client to a compressed format that remains easily searchable at the client. In one implementation, the data compressor 226 makes an initial pass through the data and constructs a table identifying the most frequently used character sequences. During a subsequent pass, the data compressor 226 compresses the data string by substituting a value for the most frequent character sequences. The data compressor 226 constructs a code table that tracks which values are substituted for the character sequences. The compressed data file and code table can then be downloaded to the client for decompression.

It is noted that the processes carried out by the EPG server are described as being implemented in software. However, in alternative implementations, some or all of these processes may be implemented in firmware and/or hardware.

Exemplary Client

Figure 3:
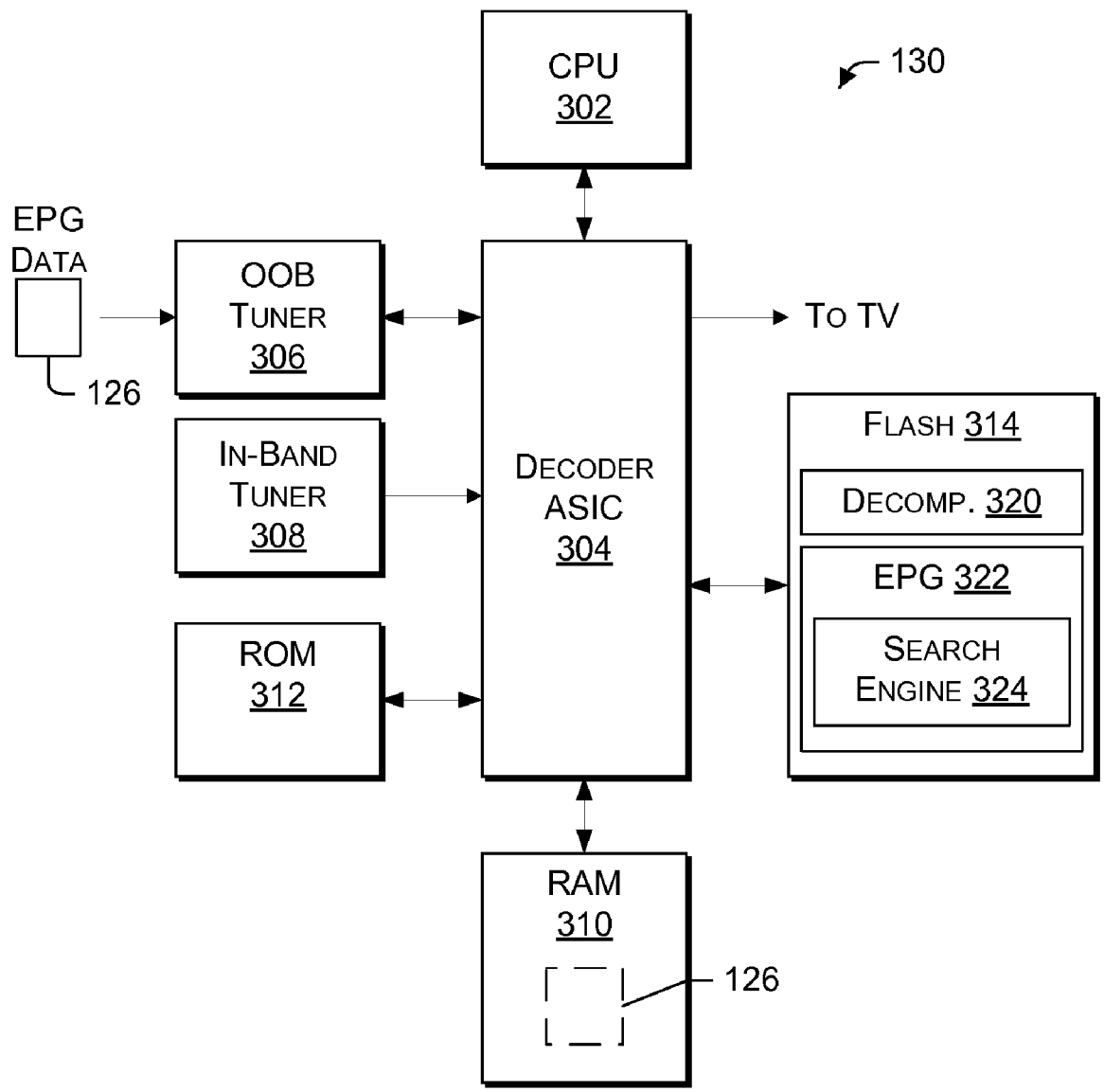
FIG. 3 is a block diagram of an exemplary client implemented as a set top box.

FIG. 3 shows an exemplary client 130 implemented as a set-top box. The client 130 has a central processing unit (CPU) 302 coupled to a decoder ASIC (application specific integrated circuit) 304. In addition to decoder circuitry, ASIC 304 may also contain logic circuitry, bussing circuitry, and a video controller. The client 130 further includes an out-of-band (OOB) tuner 306 to tune to the broadcast channel over which the EPG data file 126 is downloaded. One or more in-band tuner 308 is also provided to tune to various television signals. These signals are passed through the ASIC 304 for audio and video decoding and then to an output to the television set. With the tuners and ASIC 304, the client is equipped with hardware and/or software to receive and decode a broadcast video signal, such as an NTSC, PAL, SECAM or other TV system video signal and provide video data to the television set.

One or more memories are coupled to ASIC 304 to store software and data used to operate the client. In the illustrated implementation, the client has random access memory (RAM) 310, read only memory (ROM) 312, and flash memory 314. RAM 310 stores data used by the client, including the EPG data file 126 as well as any compression table used to decompress the file. ROM 312 stores an operating system (not shown).

One or more programs may be stored in the ROM 312 or in the flash memory 314. In the illustrated example, the flash memory 314 stores a decompression program 320 that can be executed to decompress the EPG data file 126. An EPG program 322 is also stored in the flash memory 314 to operate on the EPG data 126. The EPG program 322 may include a search engine 324 to search the EPG data in response to queries submitted by the viewer. The search engine might be used, for example, to locate particular television shows by title, or find shows with a particular rating, or identify programs with selected actors.

The client 130 may further include other components, which are not shown for simplicity purposes. For instance, the client is typically equipped with hardware and/or software to present a graphical user interface to a viewer, by which the viewer can navigate the EPG, or (if enabled) to access various Internet system network services, browse the Web, or send email. Other possible components might include a network connection (e.g., modem, ISDN modem, etc.) to provide connection to a network, an IR interface, display, power resources, etc. A remote control may further be provided to allow the user to control the client.

Fragmentation of Program Data

Low resource client 130 has limited memory resources. For example, set top boxes are typically manufactured with a fixed amount of memory that satisfies the manufacturer's price/performance criteria. A portion of this memory is allocated to hold EPG data. The amount of EPG data to be transmitted down to the set top box might be expected to consume, for example, no more than 500K bytes of memory.

Accordingly, one process performed on the EPG data prior to delivery to the client concerns formatting the EPG data into multiple blocks of a predetermined size. The client 130 designates an arbitrary data size and allocates a portion of its memory in segments of that size. The arbitrary size is communicated to the EPG server 110. The data structure fragmenter 220 "fragments" the publisher-created EPG data 104 stored in the EPG database 108, or a subset of that data, in advance of delivery to the client 130.

When finally delivered, the fragmented data fits neatly into the pre-allocated segments of the client memory. As a result, system calls to the memory for purposes of accessing EPG data are greatly reduced or eliminated, resulting in less fragmentation of memory and more efficient storage of the EPG data. It is noted that the fragmentation process may be performed at other computing sites in system 100, including at the head end services 120.

Figure 4:
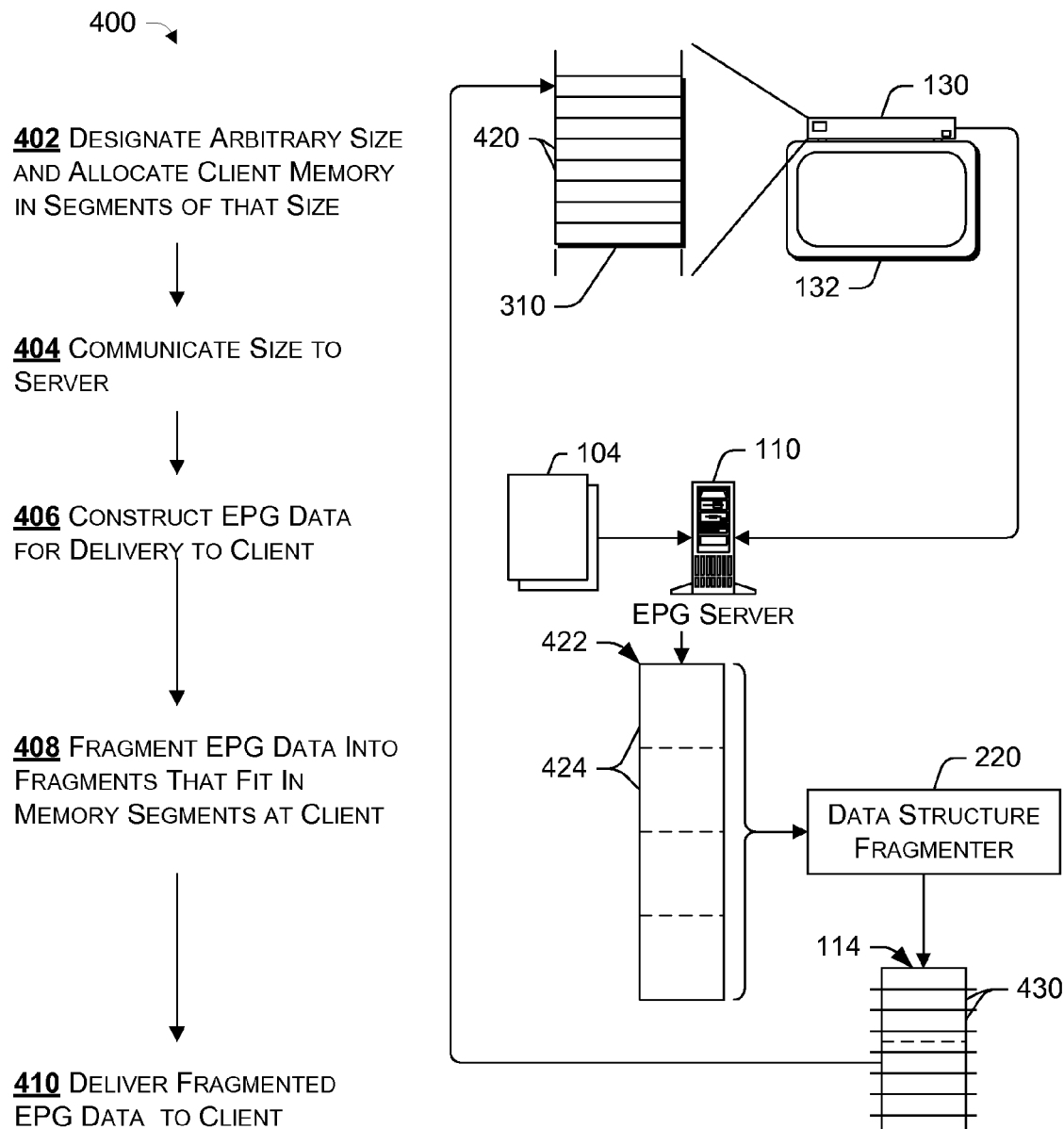
FIG. 4 illustrates an exemplary fragmentation process in which the program data file fragmented prior to delivery to the clients.

FIG. 4 illustrates one exemplary implementation of the fragmentation process 400. The process is described with reference to a diagrammatic illustration depicting exemplary components of the television entertainment system 100 that might be used to perform the enumerated operations.

At 402, the client 130 designates an arbitrary data size and allocates a portion of its memory 310 into segments 420 of that size. As one example, the memory segments 420 are equal size segments of 16K bytes. This memory allocation size might alternatively be specified by the manufacturer.

At 404, the client 130 communicates the size of the memory segments 420 to an upstream server, such as EPG server 110. Alternatively, the segment size of the client memory may be a parameter that is already known to the EPG server 110. For instance, the clients may be configured during manufacturing to allocate the memory designated for holding EPG data in certain size segments. This parameter could then be provided to the EPG server 110 as the target size for the data fragments. It is also noted that other servers besides the EPG server 110 may be employed to perform the fragmentation techniques as described herein, such as servers at head end services 120.

At 406, the EPG server 110 begins producing the EPG data file for delivery to the client. The EPG server 110 may structure and format the data file in many ways. One approach is to construct multiple tables that hold various types of EPG data to be sent to the client. For instance, there may be different tables for program listings, schedules, stations, channel numbers, and so forth. The tables may contain all or a portion of the EPG data as published by the publisher 102. The tables are arranged in a data structure, which is represented as structure 422 in FIG. 4. Each table is self-contained in that it knows its type and contents.

The table data structure 422 is broken into multiple chunks 424 that may or may not be the same size. Each chunk 424 is atomic, containing a range of records and an index to describe where the records in the table(s) fit within the context of the whole EPG data file. Each chunk 424 may hold parts of one table or up to multiple tables. Individual tables know in which chunk they reside. Table boundaries are therefore different than chunk boundaries, although they may coincide.

At 408, the data structure fragmenter 220 fragments the table structure 422 into smaller size fragments 430. Each structure fragment 430 is capable of fitting in a corresponding memory segment 420. More particularly, in our example, the EPG data fragments 430 are of a size that is guaranteed to be less than or equal to the arbitrary size designated by the client 130, or less than or equal to 16K bytes. Notice that the fragment boundaries may or may not coincide with the chunk boundaries and/or table boundaries.

At 410, the fragmented data file 114 can be delivered to the client 130 via the head end service. When the client 130 receives the fragmented data, the client stores the data fragments 430 in respective pre-allocated segments 420 without making system calls to the memory. When the client subsequently makes a call to free memory, the memory is provided in the fixed-size segments. In this way, fragmentation is constrained to the fixed-size spaces that can be more easily managed, thereby eliminating the need for memory management techniques such as de-fragmentation or garbage collection processes.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method of pre-fragmenting electronic program guide data for delivery to a low resource client, comprising:
    receiving, at a server, a file containing electronic programming guide data;
    receiving, at the server, an indication of a data size associated with the low resource client, the data size being a size of segments allocated within a portion of a memory of the low resource client;
    fragmenting, at the server, the electronic program guide data into a plurality of data fragments, the data fragments being sized according to the data size indicated by the low resource client, and being sized for storage in the segments of memory allocated in the low resource client;
    delivering the data fragments to the low resource client by transmitting the data fragments over a broadcast network for display by the low resource client; and
    compressing the electronic program data into a compressed format, the compressed format remaining searchable by the low resource client, the compressing comprising:
        identifying frequently used character sequences in the selected program data;
        substituting frequently used character sequences with a value to create a compressed data file; and
        constructing a code table that tracks which values are substituted for each frequently used character sequence, the compressed format comprising the compressed data file and the code table.

2. The method of claim 1, wherein the fragmenting comprises fragmenting the electronic programming guide data into equal-size fragments that are less than or equal to the size of the segments within the memory of the low resource client.

3. The method of claim 1, wherein the fragmenting comprises fragmenting a table structure of the electronic programming guide data into fragments that are less than or equal to the size of the segments within the memory of the low resource client.

4. The method of claim 1, wherein the indication of the data size, received at the server, was sent from the low resource client, and was selected to lessen a need for the low resource client to make system calls to memory and to lessen a need for the low resource client to utilize memory management techniques.

5. The method of claim 1, wherein the file containing electronic programming guide data contains more data for a current time period than for a subsequent time period, to thereby provide more information about the current time period than the subsequent time period.

6. The method of claim 1, wherein receiving, at the server, the data size associated with the low resource client comprises receiving the data size from the low resource client.

7. A television entertainment system, comprising:
   a server having a memory device within the server, the memory device containing a file containing electronic programming guide data; and
   a low resource client, to receive the electronic programming guide data, the low resource client of a type having a memory device organized to include segments of memory of a data size that is uniform, by:
      receiving, at the server, an indication of the data size of the segments of the memory within the memory device of the low resource client;
      fragmenting, at the server, the electronic program guide data into a plurality of equal-size data fragments, the data fragments being the size of the segments of memory within the memory device of the low resource client;
      delivering the data fragments to the low resource client; and
      compressing the electronic program data into a compressed format, the compressed format remaining searchable by the low resource client, the compressing comprising:
         identifying frequently used character sequences in the selected program data;
         substituting frequently used character sequences with a value to create a compressed data file; and
         constructing a code table that tracks which values are substituted for each frequently used character sequence, the compressed format comprising the compressed data file and the code table.

8. The television entertainment system of claim 7, wherein the fragmenting comprises fragmenting a table structure into fragments that are less than or equal to a size of the segments within the memory of the low resource client and wherein the delivering comprises transmitting the data fragments by a broadcast network for display by the low resource client.

9. The television entertainment system of claim 7, wherein the fragmenting comprises fragmenting a table structure from among the electronic programming guide data into fragments that are less than or equal to the size of the segments within the memory of the low resource client.

10. The television entertainment system of claim 7, wherein the indication of the data size, received at the server, was sent from the low resource client, and was selected to lessen a need for the low resource client to make system calls to memory and to lessen a need for the low resource client to utilize memory management techniques.

11. The television entertainment system of claim 7, wherein the file containing electronic programming guide data contains more data for a current time period than for a subsequent time period to enable a rich display of information for the current time period, while offering a subset of the data provided for the current time period for the subsequent time period.

12. The television entertainment system of claim 7, wherein receiving, at the server, of the indication of the data size associated with the low resource client, comprises receiving the data size from the low resource client.

13. A television entertainment system, comprising:
   a server having a memory device within the server, wherein the memory device contains a file, and wherein the file contains electronic programming guide data;
   wherein the server provides the electronic programming guide data to a low resource client by:
      receiving, at the server, an indication of a data size of segments of memory within a memory device of the low resource client;
      fragmenting, at the server, the electronic program guide data into a plurality of equal-size data fragments, wherein the data fragments are sized to fit the segments of memory within the memory device of the client;
      compressing the electronic program data into a compressed format, wherein the compressed format remains searchable by the low resource client, and wherein the compressing comprises:
         identifying frequently used character sequences in the selected program data;
         substituting frequently used character sequences with a value to create a compressed data file; and
         constructing a code table that tracks which values are substituted for each frequently used character sequence, wherein the compressed format comprises the compressed data file and the code table; and
      delivering the data fragments to the low resource client.

14. The television entertainment system of claim 13, wherein the fragmenting comprises fragmenting a table structure into fragments that are less than or equal to the data size of the segments of the memory of the low resource client and wherein the delivering comprises transmitting the data fragments over a broadcast network for display by the low resource client.

15. The television entertainment system of claim 13, wherein the fragmenting comprises fragmenting a table structure from among the electronic programming guide data into fragments that are less than or equal to the data size of the segments within the memory of the low resource client.

16. The television entertainment system of claim 13, wherein the data size received at the server is selected to lessen a need for the low resource client to make system calls to memory and to lessen a need for the low resource client to utilize memory management techniques.

17. The television entertainment system of claim 13, wherein the file containing electronic programming guide data contains more data for a current time period than for a subsequent time period, to thereby provide more information about the current time period than the subsequent time period.

18. The television entertainment system of claim 13, wherein receiving, at the server, the indication of the data size associated with the low resource client comprises receiving the data size from the low resource client.

* * * * *